(12) United States Patent
Zhang et al.

(10) Patent No.: US 9,036,660 B2
(45) Date of Patent: May 19, 2015

(54) METHOD AND APPARATUS FOR MANAGING MAC ADDRESS TABLE

(71) Applicant: Huawei Technologies Co., Ltd., Shenzhen, Guangdong (CN)

(72) Inventors: Shifa Zhang, Shenzhen (CN); Xuefei Tan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 13/683,142

(22) Filed: Nov. 21, 2012

(65) Prior Publication Data

US 2013/0182721 A1    Jul. 18, 2013

(30) Foreign Application Priority Data

Nov. 22, 2011    (CN) .......................... 2011 1 0373358

(51) Int. Cl.
| | |
|---|---|
| *H04L 12/751* | (2013.01) |
| *H04L 12/747* | (2013.01) |
| *H04L 29/06* | (2006.01) |
| *H04L 12/931* | (2013.01) |
| *H04L 12/935* | (2013.01) |

(52) U.S. Cl.
CPC .............. *H04L 45/02* (2013.01); *H04L 45/742* (2013.01); *H04L 63/1466* (2013.01); *H04L 49/351* (2013.01); *H04L 49/3009* (2013.01); *H04L 63/1458* (2013.01); *H04L 63/162* (2013.01); *H04L 2463/145* (2013.01)

(58) Field of Classification Search
CPC ... H04L 49/00; H04L 49/3009; H04L 49/351; H04L 2463/142; H04L 63/1466; H04L 45/021; H04L 45/66; H04L 45/745; H04L 61/6022; H04L 45/02; H04L 45/742; H04L 2463/145; H04L 63/1458; H04L 63/162
USPC ............ 370/392, 429, 401; 709/429; 375/475
See application file for complete search history.

(56) References Cited

U.S. PATENT DOCUMENTS

2004/0120269 A1    6/2004 Sumino et al.
(Continued)

FOREIGN PATENT DOCUMENTS

| | | |
|---|---|---|
| CN | 101267348 A | 9/2008 |
| EP | 2073454 A1 | 6/2009 |
| EP | 2107724 A1 | 10/2009 |

OTHER PUBLICATIONS

Extended European Search Report in corresponding European Patent Application No. 12193760.1 (Jan. 30, 2013).
Carp et al., "Practical Analysis of IPv6 Security Auditing Methods," 2010, IEEE, New York, New York.
(Continued)

*Primary Examiner* — Kwang B Yao
*Assistant Examiner* — Syed M Bokhari
(74) *Attorney, Agent, or Firm* — Leydig, Voit & Mayer, Ltd.

(57) ABSTRACT

Embodiments of the present invention disclose a method and an apparatus for managing a MAC address table. The method includes: receiving a packet and obtaining MAC address information carried in the packet; matching the MAC address information with a MAC address table; and if the matching succeeds, prolonging an aging time of the MAC address information in the MAC address table.

8 Claims, 5 Drawing Sheets

(56) References Cited

U.S. PATENT DOCUMENTS

2005/0141537 A1* 6/2005 Kumar et al. ............... 370/429
2006/0092860 A1 5/2006 Higashitaniguchi et al.
2008/0240106 A1* 10/2008 Schlenk ..................... 370/392
2008/0247396 A1* 10/2008 Hazard ...................... 370/392
2009/0182854 A1* 7/2009 Sun et al. ................... 709/223

OTHER PUBLICATIONS

Kiravuo, Timo, "Reputation based Collaboration among Ethernet Switches," International Joint Conference of IEEE, 2011, IEEE, New York, New York.

1st Office Action in corresponding European Patent Application No. 12193760.1 (Jul. 18, 2013).

* cited by examiner

| MAC address | Port (Port) | Aging time |
|---|---|---|
| MAC A | 1 | 10 |
| MAC B | 1 | 20 |
| MAC C | 2 | 20 |
| MAC D | 2 | 40 |

METHOD AND APPARATUS FOR MANAGING MAC ADDRESS TABLE

CROSS-REFERENCE TO RELATED APPLICATION

This application claims priority to Chinese Patent Application No. 201110373358.5, filed on Nov. 22, 2011, which is hereby incorporated by reference in its entirety.

FIELD OF THE INVENTION

The present invention relates to the field of computer communication, and in particular, to a method and an apparatus for managing a MAC address table.

BACKGROUND OF THE INVENTION

The development of the Internet has reached a high-speed take-off stage, and the Ethernet metropolitan area network is also growing accordingly rapidly to meet needs of persons for accessing a network anytime anywhere in everyday life. In the Ethernet metropolitan area network, masses of personal users or enterprises access the Internet through the Ethernet metropolitan area network. To forward packets quickly, an Ethernet metropolitan area network switch needs to learn and maintain a medium access control (MAC, Medium Access Control) address table. Entries of the MAC address table include an MAC address of a device connected with the Ethernet switch, a port number of the Ethernet switch connected with the device, and an identity of a virtual local area network (VLAN ID, Virtual Local Area Network Identity) to which the device belongs. The MAC address table enables the Ethernet metropolitan area network switch to find an egress for a forwarded packet accurately without necessity for broadcasting.

By making use of the feature that a switch learns the MAC address actively, an attacker on the network constructs numerous packets with fake MAC address information and send the packets with the fake MAC address information to the switch, so that limited resources in the MAC address table are occupied by the futile fake MAC address information, while MAC address information of a packet of another normal network node cannot be learned by the switch, and a user of a normal network node is unable to get online, or the switch has to perform broadcasting and search for a packet forwarding route, which causes network performance to deteriorate dramatically.

Currently, a method for preventing this kind of attack is mainly to quicken aging of the MAC address table in the switch. Quickening aging of the MAC address table refers to shortening an aging period of the MAC address table, so as to make a time of keeping the MAC address information faked by the attacker in the MAC address table as short as possible, thereby reducing the time of attacks on the switch.

However, according to the foregoing method for preventing attacks, the MAC address information of the attacker cannot be distinguished from the MAC address information of a normal user node, and aging of the MAC address information of the normal user node is also quickened when aging of the MAC address information faked by the attacker is quickened, which results is that the probability of the MAC address information of the normal user node being deleted mistakenly is also high, and a MAC address table of normal user nodes is always in the cycle of "creating-aging-creating". Creating and aging the MAC address table consume processor resources drastically. Therefore, according to the method for preventing attacks by quickening aging of the MAC address table in the switch in the prior art, a processing load of the switch is increased, and a normal user node is made get offline abnormally or even be unable to get online at all because the aging of the MAC address table is too quick.

SUMMARY OF THE INVENTION

Technical problems to be solved in embodiments of the present invention are to provide a method and an apparatus for managing a MAC address table. Aging of all MAC address information in the MAC table is no longer quickened indiscriminatingly. Instead, through a manner of analyzing behavioral characteristics of an attacker and a normal user and setting an aging time discriminatingly, MAC address information of the attacker is deleted in a shortest possible time without affecting MAC address information of a normal user node, thereby minimizing harm brought by an attack without increasing a load of a switch additionally or affecting a service of the normal user node.

An attacker aims at attacking a network rather than exchanging information. Therefore, behavior of the attacker takes on the following two characteristics:

(i) The attacker (generally launching a DOS attack) usually constructs plenty of packets randomly and sends the packets not for the purpose of exchanging information with a peer node. Therefore, the attacker does not send packets with same source MAC address information (SMAC, Source MAC) repeatedly in a time period, and meanwhile, the attacker does not use a retransmission mechanism because the retransmission mechanism consumes plenty of resources of the attacker and reduces intensity of the attack.

(ii) The attacker attacks the MAC address table of a switch. Therefore, the destination MAC address information (DMAC, Destination MAC) of the packet sent by the attacker is generally an invalid address, and it is unlikely to get an answer.

In view of the foregoing characteristics of an attacker, an embodiment of the present invention provides a method for managing a MAC address table. The method includes:

receiving a packet and obtaining MAC address information carried in the packet; and matching the MAC address information with the MAC address table, and, if the matching succeeds, prolonging an aging time of the MAC address information in the MAC address table, where the MAC address information includes source address information SMAC and/or destination address information DMAC.

The matching the MAC address information with the MAC address table, and, if the matching succeeds, prolonging the aging time of the MAC address information in the MAC address table includes:

judging whether the SMAC address information matches the MAC address information recorded in the MAC address table;

if the matching succeeds, updating the aging time of the MAC address information in the MAC address table according to a preset delay rule; and if the matching fails, writing the SMAC address information into the MAC address table, and setting the aging time of the MAC address information to a shortest aging time.

The matching the MAC address information with the MAC address table, and, if the matching succeeds, prolonging the aging time of the MAC address information in the MAC address table includes:

judging whether the DMAC address information matches the MAC address information recorded in the MAC address table; and if the matching succeeds, updating an aging time of the DMAC address information in the MAC address table according to a preset delay rule.

The matching the MAC address information with the MAC address table, and, if the matching succeeds, prolonging the aging time of the MAC address information in the MAC address table further includes:

refreshing the MAC address table, and managing the MAC address table according to the updated aging time of the MAC address information; and deleting the MAC address information from the MAC address table when the aging time of the MAC address information expires.

The preset delay rule is presetting at least two aging times with increasing duration; and, when the MAC address information matches the MAC address table, updating the aging time of the MAC address information in the MAC address table until the MAC address information has a longest aging time in the preset delay rule, where the updated aging time of the MAC address information is longer than the aging time before the update.

Accordingly, the present invention further provides an apparatus for managing a MAC address table, where the apparatus includes:

a packet receiving module, configured to receive a packet and obtain MAC address information carried in the packet;

a delay processing module, configured to match the MAC address information obtained by the packet receiving module with a MAC address table, and, if the matching succeeds, prolong an aging time of the MAC address information in the MAC address table, where the MAC address information includes: SMAC address information and/or DMAC address information.

The delay processing module includes:

a matching unit, configured to judge whether the SMAC and/or DMAC address information matches the MAC address information recorded in the MAC address table; and a processing unit, configured to: update an aging time of the SMAC and/or DMAC address information in the MAC address table according to a preset delay rule when the SMAC and/or DMAC address information succeeds in matching the MAC address table; or, when the SMAC address information fails in matching the MAC address table, write the SMAC address information into the MAC address table, and set the aging time of the MAC address information to a shortest aging time.

The apparatus for managing a MAC address table further includes:

a MAC address table managing module, configured to manage the MAC address table processed by the delay processing module, and delete the MAC address information from the MAC address table when the aging time of the MAC address information in the MAC address table expires.

The delay processing module further includes:

a presetting unit, configured to preset a delay rule, where the preset delay rule is presetting at least two aging times with increasing duration.

When the processing unit updates the aging time of the SMAC and/or DMAC address information in the MAC address table, the update is performed according to the preset delay rule until the MAC address information has a longest aging time in the preset delay rule, where the updated aging time of the SMAC and/or DMAC address information is longer than the aging time before the update.

In view of characteristics of an attacker, according to the method and the apparatus for managing a MAC address table provided in the present invention, different aging times may be set for different MAC address information. All MAC address information learned for a first time is regarded as being sent by a suspected attacker, and aging times of such MAC address information in the MAC address table are set to be the shortest; when the MAC address information is learned for a second time, the suspicion is reduced, and the aging time of the MAC address information is prolonged; when the MAC address information is refreshed by a response packet once or repeatedly, it may be further determined that the MAC address information belongs to a normal user node, and the aging time of the MAC address information is adjusted to a normal aging time.

According to the method and the apparatus for managing a MAC address table provided in the present invention, through a manner of analyzing the behavioral characteristics of the attacker and the normal user and setting the aging time discriminatingly, the MAC address information of the attacker is deleted in the shortest possible time without affecting the MAC address information of the normal user node, thereby minimizing the harm brought by the attack without increasing the load of the switch additionally or affecting the service of the normal user node.

BRIEF DESCRIPTION OF THE DRAWINGS

To make the technical solutions in the embodiments of the present invention or in the prior art clearer, accompanying drawings involved in the description of the embodiments or the prior art are briefly introduced below. Apparently, the accompanying drawings in the following description are merely some embodiments of the present invention, and persons of ordinary skill in the art may further obtain other drawings according to these accompanying drawings without creative efforts.

DETAILED DESCRIPTION OF THE EMBODIMENTS

According to a method and an apparatus for managing a MAC address table provided in the present invention, through a manner of analyzing behavioral characteristics of an attacker and a normal user and setting an aging time discriminatingly, MAC address information of the attacker is deleted in a shortest possible time without affecting MAC address information of a normal user node, thereby minimizing harm brought by an attack without increasing a load of a switch additionally or affecting a service of the normal user node.

The technical solutions in the embodiments of the present invention are clearly and completely described below in conjunction with the accompanying drawings in the embodiments of the present invention. Evidently, the embodiments to be described are merely part of rather than all of the embodiments of the present invention. All other embodiments, which are obtained by those of ordinary skill in the art based on the embodiments of the present invention without making creative efforts, shall fall within the protection scope of the present invention.

Figure 1:
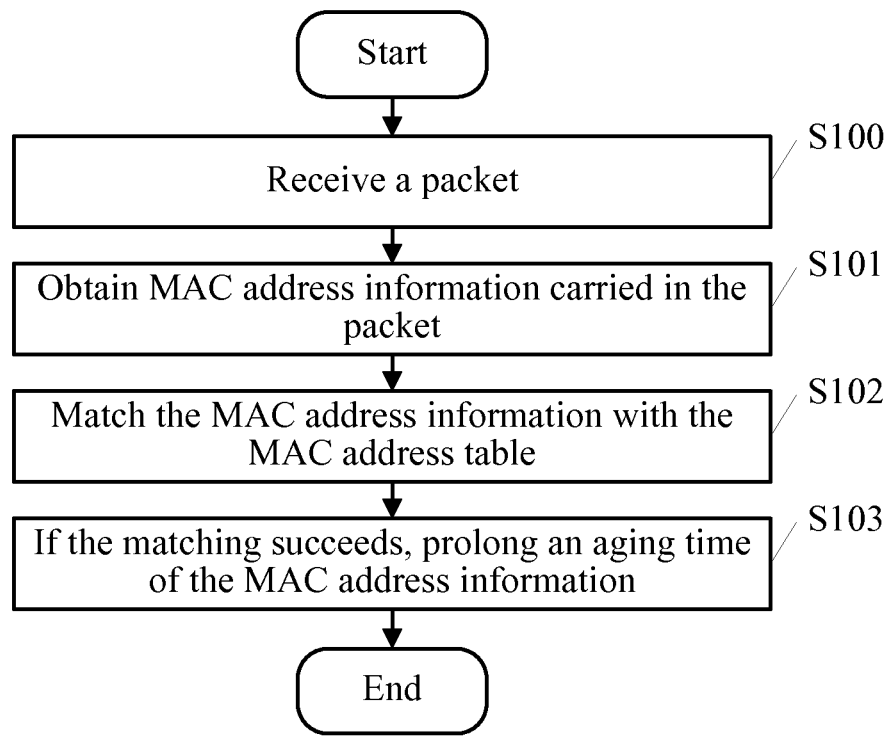
FIG. 1 is a schematic flowchart of a method for managing a MAC address table according to a first embodiment of the present invention.

Referring to FIG. 1, FIG. 1 is a schematic flowchart of a method for managing a MAC address table according to a first embodiment of the present invention. As shown in FIG. 1, the method includes:

Step S100: Receive a packet.

Step S101: Obtain MAC address information carried in the packet.

Step S102: Match the MAC address information with the MAC address table, and, if the matching succeeds, go to step S103.

Step S103: Prolong an aging time of the MAC address information in the MAC address table.

According to the method for managing a MAC address table provided in the present invention, by making use of characteristics that SMAC carried in a packet sent by an attacker is generally not repeated and that DMAC is generally invalid and not answered, MAC address information of a normal user node is distinguished from MAC address information faked by the attacker. Therefore, the MAC address information faked by the attacker is deleted in a shortest possible time without affecting the MAC address information of the normal user node, and harm brought by an attack is minimized without increasing a load of a switch additionally or affecting a service of the normal user node.

Figure 2:
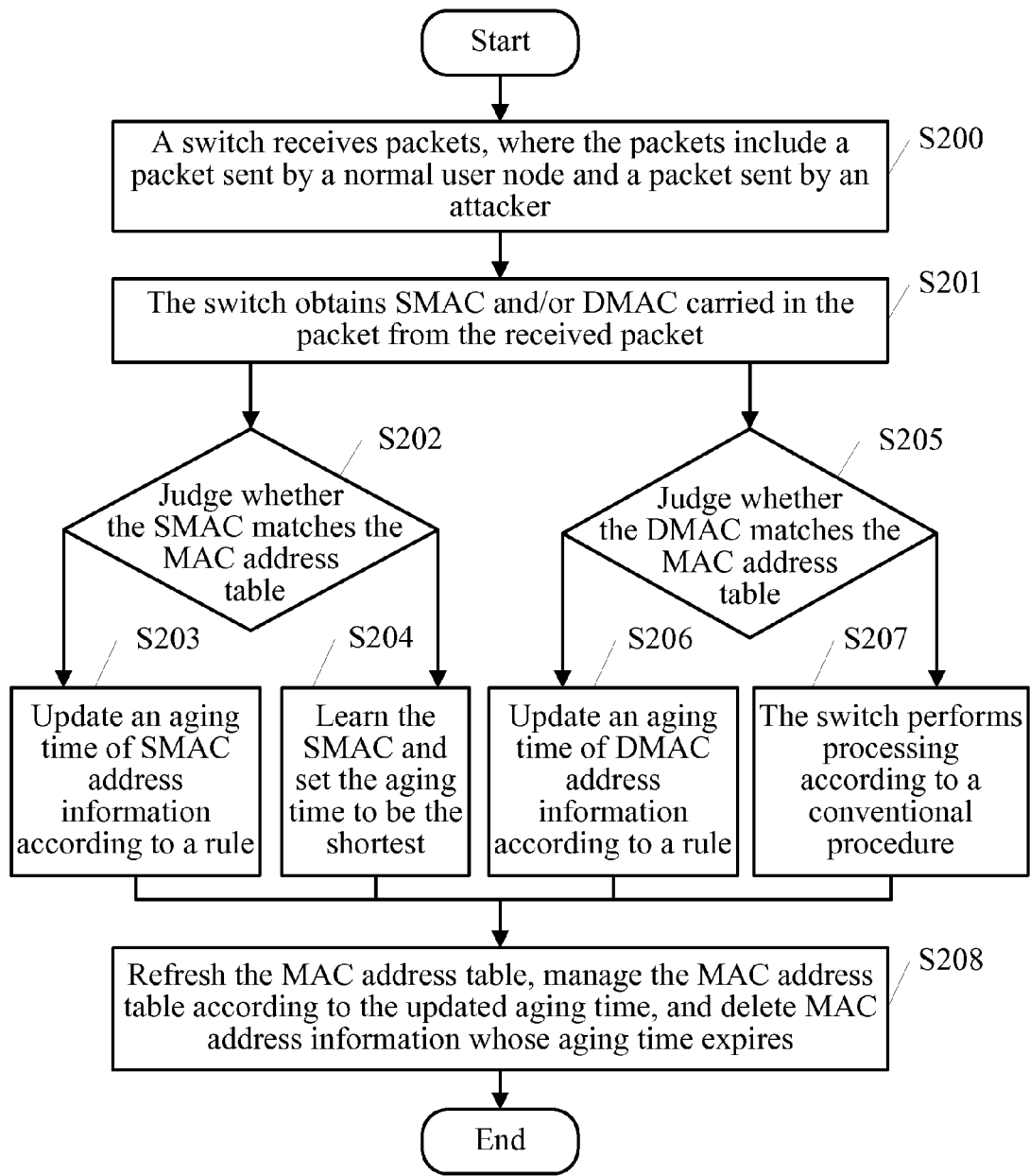
FIG. 2 is a schematic flowchart of a method for managing a MAC address table according to a second embodiment of the present invention.

Referring to FIG. 2, FIG. 2 is a schematic flowchart of a method for managing a MAC address table according to a second embodiment of the present invention. In this embodiment, a procedure of the method for managing a MAC address table is described in more detail, as shown in FIG. 2:

Step S200: A switch receives packets, where the packets include a packet sent by a normal user node and a packet sent by an attacker. Each of such packets carries SMAC and/or DMAC address information of the packet. Certainly, SMAC and DMAC carried in the packet sent by the attacker are generally fake address information; and SMAC and DMAC carried in the packet sent by the normal user node are generally authentic address information.

The SMAC is used to indicate the MAC of a node that sends the packet; and the DMAC is used to indicate the MAC of a destination node of the packet (namely, a node that receives the packet). Most packets carry both the SMAC and the DMAC simultaneously, but some response packets sent by certain nodes to a corresponding switch may carry only the SMAC or only the DMAC.

Step S201: The switch obtains the SMAC and/or DMAC carried in the packet from the received packet, performs steps S202 to S204 according to the obtained SMAC, and performs steps S205 to S207 according to the obtained DMAC. Certainly, if the packet carries only the SMAC, only steps S202 to S204 are performed; if the packet carries only the DMAC, only steps S205 to S207 are performed.

It should be emphasized that, order between steps S202 to S204 and steps S205 to S207 is arbitrary. Steps S205 to S207 may be performed first, and then steps S202 to S204 are performed; steps S202 to S204 and steps S205 to S207 may also be performed simultaneously; and steps S202 to S204 may be performed first, and then steps S205 to S207 are performed.

Step S202: Judge whether the SMAC address information matches the MAC address information recorded in the MAC address table. More specifically, the switch judges whether the SMAC address information carried in the packet is consistent with any MAC address that is already learned in the MAC address table in the switch. If consistent, it is determined that the matching succeeds, and step S203 is performed; if not consistent, it is determined that the matching fails, and step S204 is performed.

Step S203: Update an aging time of the MAC address information in the MAC address table according to a preset delay rule.

The attacker generally does not send packets with same SMAC address information repeatedly in a time period (which consumes plenty of resources of the attacker and reduces intensity of the attack). Therefore, if the SMAC address information carried in the packet matches the MAC address information recorded in the MAC address table of the switch, it indicates that the MAC address information has been used, it is less possible that the SMAC address information is MAC address information faked by the attacker, and an aging time of the SMAC address information in the MAC address table may be prolonged, for example, from the original 20 s to 40 s according to a preset rule.

Step S204: Write the SMAC address information into the MAC address table, and set the aging time of the MAC address information to a shortest aging time.

If the SMAC address information carried in the packet does not match the MAC address information recorded in the MAC address table of the switch, it indicates that the MAC address information has not been used in a time period, and may be MAC address information faked by the attacker. Therefore, its aging time is set to a shortest aging time (which needs to be greater than a timeout retransmission time specified in any mainstream protocol, generally, greater than 2 s).

Step S205: Judge whether the DMAC address information matches the MAC address information recorded in the MAC address table. More specifically, the switch judges whether the DMAC address information carried in the packet is consistent with any MAC address that is already learned in the MAC address table in the switch. If consistent, it is determined that the matching succeeds, and step S206 is performed; if not consistent, it is determined that the matching fails, and step S207 is performed.

Step S206: Update the aging time of the MAC address information in the MAC address table according to a preset delay rule.

The attacker attacks the MAC address table of the switch. Therefore, the DMAC address information of the packet sent by the attacker is generally an invalid address, and it is unlikely to get an answer. Therefore, if the DMAC address information carried in the packet matches the MAC address information recorded in the MAC address table of the switch, it indicates that another node has sent a packet to the node of a DMAC address. Therefore, it is less possible that the DMAC address information is the MAC address information faked by the attacker, and the aging time of the DMAC address information in the MAC address table may be prolonged.

Step S207: If the DMAC address information fails in matching the MAC address information recorded in the MAC address table, the switch performs processing according to a conventional procedure, for example, performs broadcast and searches for a route to the DMAC address.

Step S208: Refresh the MAC address table, and manage the MAC address table according to the updated aging time of the MAC address information; and delete certain MAC address information from the MAC address table when an aging time of the MAC address information in the MAC address table expires.

According to the method for managing a MAC address table provided in the present invention, in view of characteristics of an attacker, all MAC address information learned for a first time is regarded as being sent by a suspected attacker, and aging times of such MAC address information in the MAC address table are set to be the shortest; when the MAC address information is learned or used for a second time, the suspicion is reduced, and the aging time of the MAC address information is prolonged. According to the method for managing a MAC address table provided in the present invention, through a manner of setting the aging time of the MAC address information discriminatingly, the MAC address information of the attacker is deleted in a shortest possible time without affecting the MAC address information of the normal user node, thereby minimizing harm brought by an attack without increasing a load of a switch additionally or affecting a service of the normal user node.

Those skilled in the art should be able to implement the method for managing a MAC address table provided in the present invention according to the foregoing description. For better public understanding, another example is further taken to specifically describe a procedure of matching the MAC address information and subsequent processing in the method for managing a MAC address table.

Figure 3:
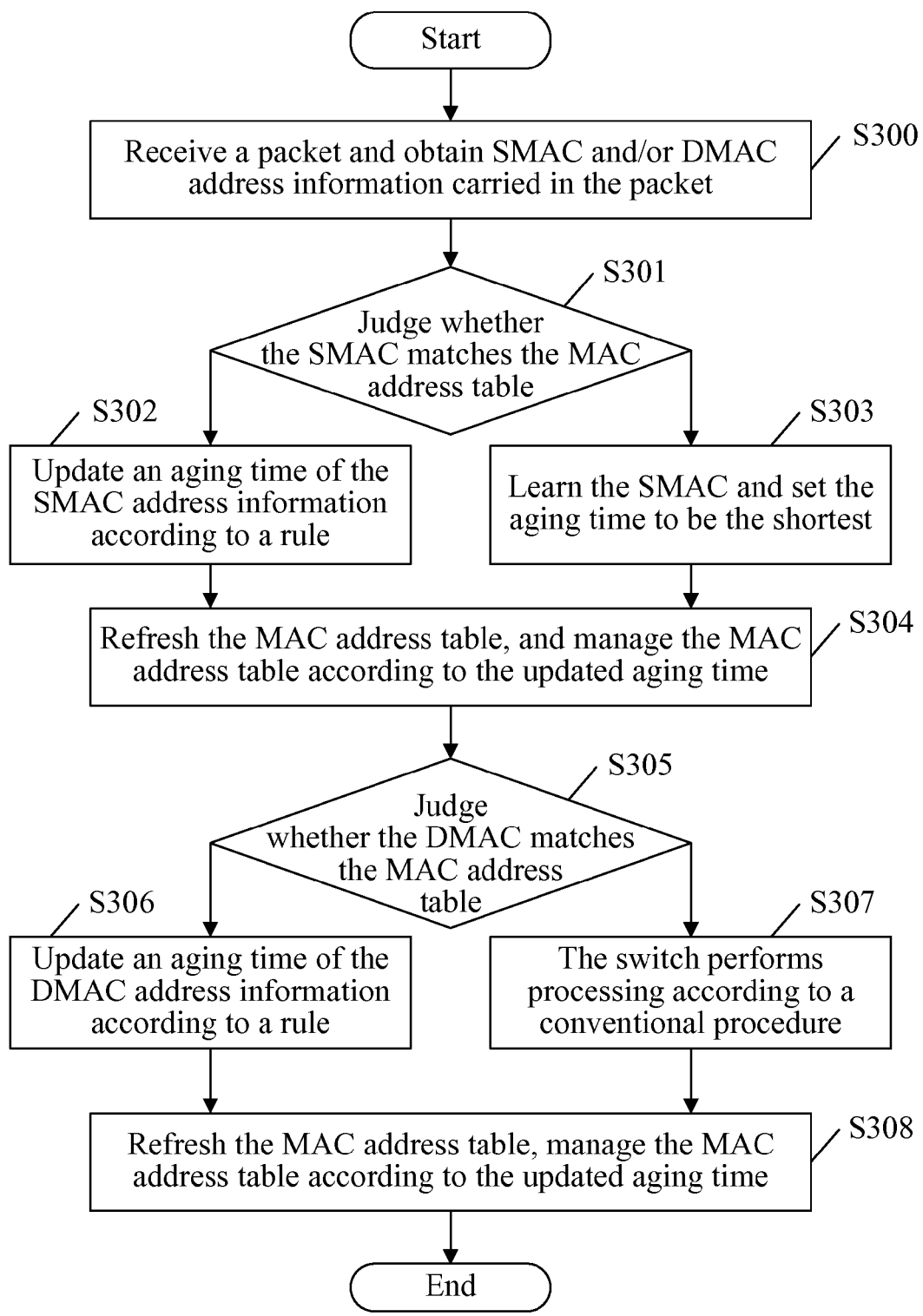
FIG. 3 is a schematic flowchart of a method for managing a MAC address table according to a third embodiment of the present invention.

Referring to FIG. 3, FIG. 3 is a schematic flowchart of a method for managing a MAC address table according to a third embodiment of the present invention. In this embodiment, description of the procedure of matching the MAC and subsequent processing is emphasized. Referring to FIG. 3:

Step S300: Receive a packet and obtain SMAC and/or DMAC address information carried in the packet. In the following steps, steps S301 to S304 are a procedure in which a switch processes the MAC address table according to the SMAC address information, steps S305 to S308 are a procedure in which the switch processes the MAC address table according to the DMAC address information, and order between the foregoing two processing procedures is arbitrary.

Step S301: Judge whether the SMAC address information matches the MAC address information recorded in the MAC address table. More specifically, the switch judges whether the SMAC address information carried in the packet is consistent with any MAC address that is already learned in the MAC address table in the switch. If consistent, it is determined that the matching succeeds, and step S302 is performed; if not consistent, it is determined that the matching fails, and step S303 is performed.

Figure 4:
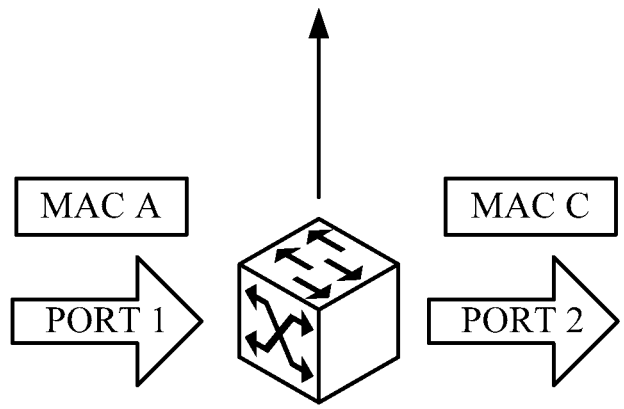
FIG. 4 is a schematic working diagram of a switch according to the present invention.

Referring to FIG. 4, it is assumed that the MAC address information learned by the MAC address table in the switch is shown in Table 1 (Table 1 corresponds to FIG. 4):

TABLE 1

| MAC address | Port (Port) | Aging time |
| --- | --- | --- |
| MAC A | 1 | 10 |
| MAC B | 1 | 20 |
| MAC C | 2 | 20 |
| MAC D | 2 | 40 |

In this case, the switch receives a packet from a port 1, where SMAC carried in the packet is MAC A, and therefore, the switch judges whether MAC A already exists in the MAC address table thereof. If exists, it is determined that the matching succeeds, and S302 is performed; if not consistent, for example, if the SMAC carried in the packet is MAC H, it is determined that the matching fails, and step S303 is performed.

Step S302: Prolong an aging time of the SMAC address information in the MAC address table according to a preset delay rule. More specifically, the preset delay rule is presetting at least two aging times with increasing duration. When the MAC address information carried in the packet matches the MAC address table, the switch updates the aging time of the MAC address information in the MAC address table until the MAC address information has a longest aging time in the preset delay rule, where the updated aging time of the MAC address information is longer than the aging time before the update.

For example, in this embodiment, it is assumed that preset aging times with increasing duration according to the delay rule are: 5 s, 10 s, 20 s, and 40 s, and an original aging time of the SMAC address information (MAC A) in the MAC address table is 10 s. After the switch determines that the SMAC address information matches the MAC address table in step S301, in this step, the switch updates the aging time of the SMAC address information in the MAC address table to 20 s according to the preset delay rule, as shown in Table 2:

TABLE 2

| MAC address | Port (Port) | Aging time |
| --- | --- | --- |
| MAC A | 1 | 20 |
| MAC B | 1 | 20 |
| MAC C | 2 | 20 |
| MAC D | 2 | 40 |

It should be noted that, if the aging time of the SMAC address information in the MAC address table is already the longest aging time specified in the delay rule, the switch only refreshes the aging time of the SMAC address information without further prolonging the aging time.

Step S303: If determining that the SMAC address information does not match the MAC address table, the switch writes the SMAC address information into the MAC address table, and sets the aging time of the MAC address information to a shortest aging time.

More specifically, if the SMAC address information does not match the MAC address table, it indicates that the node at the SMAC address has never sent a packet, or the aging time of the SMAC address information in the MAC address table has expired and the SMAC address information is deleted by the switch from the MAC address table. For example, if the SMAC address information is MAC H, the switch writes MAC H into the MAC address table, and sets an aging time of MAC H to the shortest aging time, namely, 5 s. In this case, the MAC address table is shown in Table 3:

TABLE 3

| MAC Address | Port (Port) | Aging Time |
| --- | --- | --- |
| MAC A | 1 | 10 |
| MAC B | 1 | 20 |
| MAC C | 2 | 20 |
| MAC D | 2 | 40 |
| MAC H | 2 | 5 |

Step S304: Refresh the MAC address table, and manage the MAC address table according to the updated aging time of the MAC address information; and delete certain MAC address information from the MAC address table when an aging time of the MAC address information in the MAC address table expires.

Step S305: Judge whether the DMAC address information matches the MAC address information recorded in the MAC address table. More specifically, the switch judges whether the DMAC address information carried in the packet is consistent with any MAC address that is already learned in the MAC address table in the switch. If consistent, it is determined that the matching succeeds, and step S306 is performed; if not consistent, it is determined that the matching fails, and step S307 is performed.

Also referring to FIG. 4, in this case, the switch receives a packet from the port 1, where DMAC carried in the packet is MAC C, and therefore, the switch judges whether MAC C already exists in its MAC address table thereof. If exists, it is determined that the matching succeeds, and step S306 is performed; if not consistent, for example, if the DMAC carried in the packet is MAC H, it is determined that the matching fails, and step S307 is performed.

Step S306: Prolong an aging time of the DMAC address information in the MAC address table according to the preset delay rule. If the aging time of the DMAC address information in the MAC address table is already the longest aging time specified in the delay rule, the switch only refreshes the aging time of the DMAC address information without further prolonging the aging time. Meanwhile, the switch sends the packet from a port 2 corresponding to MAC C according to the information in the MAC address table.

Step S307: If determining that the DMAC address information fails in matching the MAC address information recorded in the MAC address table, the switch performs processing according to a conventional procedure, for example, performs broadcast and searches for a route to a DMAC address. Further, if the DMAC address information is valid address information, after receiving the broadcast from the switch, a corresponding node sends a feedback packet to the switch. According to the feedback packet, the switch performs steps S300 to S304 to learn the MAC address information.

Step S308: Refresh the MAC address table, and manage the MAC address table according to the updated aging time of the MAC address information; and delete certain MAC address information from the MAC address table when an aging time of the MAC address information in the MAC address table expires.

According to the method for managing a MAC address table provided in the present invention, in view of characteristics of an attacker, all MAC address information learned for a first time is regarded as being sent by a suspected attacker, and aging times of such MAC address information in the MAC address table are set to be the shortest; when the MAC address information is learned or used for a second time, the suspicion is reduced, and the aging time of the MAC address information is prolonged. According to the method for managing a MAC address table provided in the present invention, through a manner of setting the aging time of the MAC address information discriminatingly, MAC address information of the attacker is deleted in a shortest possible time without affecting MAC address information of a normal user node, thereby minimizing harm brought by an attack without increasing a load of a switch additionally or affecting a service of the normal user node.

Figure 5:
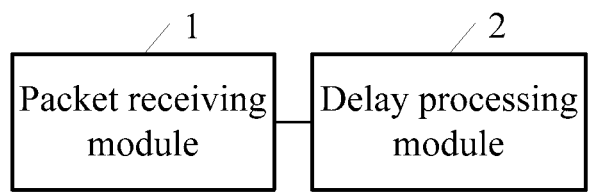
FIG. 5 is a schematic structural diagram of an apparatus for managing a MAC address table according to a first embodiment of the present invention.

Referring to FIG. 5, FIG. 5 is a schematic structural diagram of an apparatus for managing a MAC address table according to a first embodiment of the present invention. As shown in FIG. 5, the apparatus includes:

a packet receiving module 1, configured to receive a packet and obtain MAC address information carried in the packet;

a delay processing module 2, configured to match the MAC address information obtained by the packet receiving module 1 with the MAC address table, and, if the matching succeeds, prolong an aging time of the MAC address information in the MAC address table.

The apparatus for managing a MAC address table provided in the embodiment of the present invention may implement the method in the first embodiment of the method for managing a MAC address table provided in the present invention, and the apparatus for managing a MAC address table provided in this embodiment may be applicable in a switch.

By making use of characteristics that SMAC carried in a packet sent by an attacker is generally not repeated and that DMAC is generally invalid and not answered, the apparatus for managing a MAC address table provided in the present invention distinguishes MAC address information of a normal user node from MAC address information faked by the attacker. Therefore, the faked MAC address information of the attacker is deleted in a shortest possible time without affecting the MAC address information of the normal user node, and harm brought by an attack is minimized without increasing a load of a switch additionally or affecting a service of the normal user node.

Figure 6:
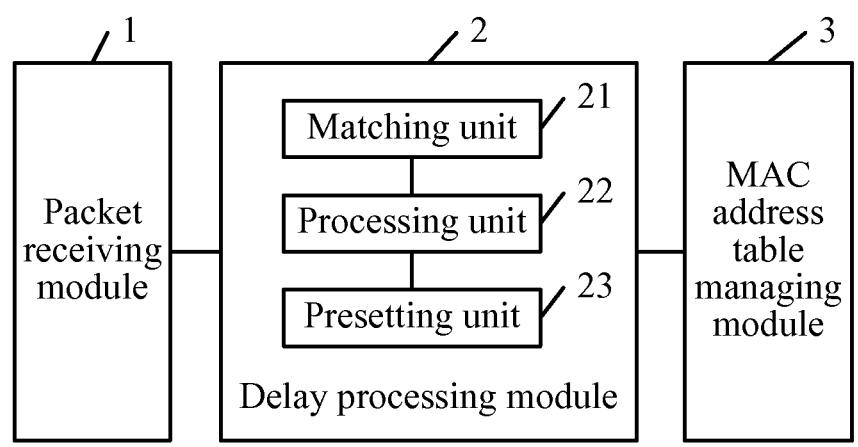
FIG. 6 is a schematic structural diagram of an apparatus for managing a MAC address table according to a second embodiment of the present invention.

Referring to FIG. 6, FIG. 6 is a schematic structural diagram of an apparatus for managing a MAC address table according to a second embodiment of the present invention. In this embodiment, the structure of the apparatus for managing a MAC address table is described in more detail. As shown in FIG. 6, the apparatus includes:

A packet receiving module 1 is configured to receive a packet and obtain MAC address information carried in the packet. The packet receiving module 1 not only receives a packet sent by a normal user node, but also receives a packet sent by an attacker. In fact, the packet receiving module 1 is unable to distinguish a normal packet from an attack packet. Each of such packets carries SMAC and/or DMAC address information of the packet. Certainly, SMAC and DMAC carried in the packet sent by the attacker are generally fake address information; and SMAC and DMAC carried in the packet sent by the normal user node are generally authentic address information.

A delay processing module 2 is configured to match the MAC address information obtained by the packet receiving module 1 with the MAC address table, and, if the matching succeeds, prolong an aging time of the MAC address information in the MAC address table. More specifically, the delay processing module 2 needs to perform different processing according to the SMAC and DMAC. The delay processing module 2 includes:

A matching unit 21 is configured to judge whether the SMAC and/or DMAC address information matches the MAC address information recorded in the MAC address table. More specifically, the matching unit 21 judges whether the SMAC and/or DMAC address information carried in the packet is consistent with any MAC address that is already learned in the MAC address table in a switch. If consistent, it is determined that the matching succeeds; if not consistent, it is determined that the matching fails.

A processing unit 22 is configured to: update an aging time of the SMAC and/or DMAC address information in the MAC address table according to a preset delay rule when the SMAC and/or DMAC address information succeeds in matching the MAC address table; or, when the SMAC address information fails in matching the MAC address table, write the SMAC address information into the MAC address table, and set the aging time of the MAC address information to a shortest aging time.

Further, the delay processing module 2 further includes:

a presetting unit 23, configured to preset a delay rule, where the preset delay rule is presetting at least two aging times with increasing duration, such as 5 s, 10 s, 20 s, and 40 s. When the matching unit 21 determines that the MAC address information carried in the packet matches the MAC address table, the processing unit 22 updates the aging time of the MAC address information in the MAC address table until the MAC address information has a longest aging time in the preset delay rule, where the updated aging time of the MAC address information is longer than the aging time before the update.

When the SMAC and/or DMAC address information succeeds in matching the MAC address table, the processing unit 22 performs similar processing, namely, prolongs the aging time of the SMAC and/or DMAC address information in the MAC address table. Certainly, the SMAC and the DMAC may correspond to different delay rules. For example, a delay rule applied when the SMAC matches the MAC address table is: 5 s, 10 s, 20 s, and 40 s; and a delay rule applied when the DMAC matches the MAC address table is: 10 s and 40 s.

A processing manner applied by the processing unit 22 is different when the SMAC and/or DMAC address information fails in matching the MAC address table. If the SMAC fails in matching the MAC address table, the processing unit 22 writes the SMAC address information into the MAC address table, and sets the aging time of the MAC address information to a shortest aging time. If the DMAC fails in matching the MAC address table, the processing unit 22 performs processing according to a conventional procedure, for example, performs broadcast and searches for a route to a DMAC address.

Further, the apparatus for managing a MAC address table provided in the embodiment of the present invention further includes a MAC address table managing module 3. The MAC address table managing module 3 is configured to manage the MAC address table processed by the delay processing module 2 (it is possible that new MAC address information is written, or an aging time of certain MAC address information is prolonged and refreshed), and delete the MAC address information from the MAC address table when the aging time of the MAC address information in the MAC address table expires.

The apparatus for managing a MAC address table provided in the embodiment of the present invention may implement the methods described in the second and third embodiments of the method for managing a MAC address table provided in the present invention, and the apparatus for managing a MAC address table provided in this embodiment may be applicable in a switch.

In view of characteristics of an attacker, the apparatus for managing a MAC address table provided in the present invention regards all MAC address information learned for a first time as being sent by a suspected attacker, and sets aging times of such MAC address information in the MAC address table to be the shortest; when the MAC address information is learned or used for a second time, reduces the suspicion, and prolongs the aging time of the MAC address information. According to the method for managing a MAC address table provided in the present invention, through a manner of setting the aging time of the MAC address information discriminatingly, MAC address information of an attacker is deleted in a shortest possible time without affecting MAC address information of a normal user node, thereby minimizing harm caused by an attack without increasing a load of a switch additionally or affecting a service of the normal user node.

Persons of ordinary skill in the art may understand that, all or part of the procedures of the method in the foregoing embodiments may be implemented by a computer program instructing relevant hardware. The program may be stored in a computer readable storage medium. When the program is executed, the procedures of the method in the foregoing embodiments may be included. The storage medium may be a magnetic disk, an optical disk, a read-only memory (Read-Only Memory, ROM) or a random access memory (Random Access Memory, RAM), and so on.

Disclosed above are merely exemplary embodiments of the present invention, and definitely are not intended to limit the scope of the present invention. Therefore, equivalent variations made according to the claims of the present invention shall fall within the scope of the present invention.

What is claimed is:

1. A method for managing a Medium Access Control (MAC) address table, comprising:
   receiving a packet and obtaining MAC address information carried in the packet; and
   matching the MAC address information with an entry within the MAC address table, and, when the matching succeeds, prolonging an aging time of the entry containing the MAC address information in the MAC address table;
   wherein the MAC address information comprises at least one of the group consisting of: source MAC (SMAC) address information and destination MAC (DMAC) address information;
   wherein the matching the MAC address information with the entry within the MAC address table, and the prolonging the aging time of the MAC address information in the MAC address table when the matching succeeds comprise:
      judging, when the MAC address information comprises the SMAC address information, whether the SMAC address information matches the MAC address information recorded in the MAC address table, and
      updating, when judging the SMAC address information matching succeeds, the aging time of the entry within the MAC address information in the MAC address table according to a preset delay rule,
   wherein the preset delay rule presets at least two aging times with increasing duration; and, when the MAC address information matches the entry within the MAC address table, updating the aging time of the entry containing the MAC address information in the MAC address table until the MAC address information has a longest aging time in the preset delay rule; and the updated aging time of the MAC address information is longer than the aging time before the update.

2. The method for managing a MAC address table according to claim 1, further comprising:
   writing, when judging the SMAC address information matching fails the SMAC address information into a new entry within the MAC address table, and setting the aging time of the new entry within the MAC address information to a shortest aging time.

3. The method for managing a MAC address table according to claim 1, wherein:
   the matching the MAC address information with the entry within the MAC address table, and the prolonging the aging time of the MAC address information in the MAC address table if the matching succeeds comprise:
      when the MAC address information comprises the DMAC address information judging whether the DMAC address information matches the MAC address information recorded in the MAC address table; and updating, when judging the DMAC address information matching succeeds, the aging time of the entry within the DMAC address information in the MAC address table according to a preset delay rule.

4. The method for managing a MAC address table according to claim 1, wherein:

the matching the MAC address information with the entry within the MAC address table, and the prolonging the aging time of the MAC address information in the MAC address table when the matching succeeds further comprise:

refreshing the MAC address table, and managing the entry within the MAC address table according to the updated aging time of the MAC address information; and deleting the MAC address information from the MAC address table when the aging time of the MAC address information expires.

5. An apparatus including a processor and a non-transitory computer readable medium including computer-executable instructions, executable by the processor, for managing a Medium Access Control (MAC) address table, the computer-executable instructions comprising:

a packet receiving module, configured to receive a packet and obtain MAC address information carried in the packet; and a delay processing module, configured to match the MAC address information obtained by the packet receiving module with an entry within the MAC address table, and, when the matching succeeds, prolong an aging time of the entry containing the MAC address information in the MAC address table;

wherein the MAC address information comprises at least one of the group consisting of: source MAC (SMAC) address information and destination MAC (DMAC) address information; and wherein the delay processing module further comprises:

presetting unit, configured to preset a delay rule, wherein the preset delay rule presets at least two aging times with increasing duration wherein when the delay processing unit updates the aging time of the at least one of the group consisting of the SMAC address information and the DMAC address information in the ent within the MAC address table, the updating is performed according to the preset delay rule until the entry containing the MAC address information has a longest aging time in the preset delay rule, wherein the updated aging time of the at least one of the group consisting of the SMAC address information and the DMAC address information is longer than the aging time of the at least one of the group consisting of the SMAC address information and the DMAC address information before the updating.

6. The apparatus for managing a MAC address table according to claim 5, wherein the delay processing module comprises:

a matching unit, configured to judge whether the at least one of the group consisting of the SMAC address information and the DMAC address information matches the MAC address information recorded in the MAC address table; and a processing unit, configured to: update an aging time of the at least one of the group consisting of the SMAC address information and the DMAC address information in the entry within the MAC address table according to a preset delay rule, when the at least one of the group consisting of the SMAC address information and the DMAC address information succeeds in matching the entry within the MAC address table.

7. The apparatus for managing a MAC address table according to claim 5, further comprising:

a MAC address table managing module, configured to manage the entry within the MAC address table processed by the delay processing module, and delete the MAC address information from the entry within the MAC address table when the aging time of the MAC address information in the MAC address table expires.

8. The apparatus for managing a MAC address table according to claim 5, wherein the delay processing module comprises:

a matching unit, configured to judge whether the at least one of the group consisting of the SMAC address information and the DMAC address information matches the MAC address information recorded in the MAC address table; and a processing unit, configured to: write the SMAC address information into an entry within the MAC address table, and set an aging time of the entry within the MAC address able to a shortest aging time when the SMAC address information fails in matching the MAC address table.

* * * * *

UNITED STATES PATENT AND TRADEMARK OFFICE
CERTIFICATE OF CORRECTION

| | | |
|---|---|---|
| PATENT NO. | : 9,036,660 B2 | Page 1 of 1 |
| APPLICATION NO. | : 13/683142 | |
| DATED | : May 19, 2015 | |
| INVENTOR(S) | : Zhang et al. | |

It is certified that error appears in the above-identified patent and that said Letters Patent is hereby corrected as shown below:

In the claims

Column 13, line 45, "ent" should read -- entry --.

Column 14, line 43, "able" should read -- table --.

Signed and Sealed this
Twenty-second Day of December, 2015

Michelle K. Lee
*Director of the United States Patent and Trademark Office*